United States Patent [19]

Hagen

[11] Patent Number: 6,027,788
[45] Date of Patent: Feb. 22, 2000

[54] ELASTOMERIC COMPOUND WITH TEXTURED FINISH AND METHOD FOR MANUFACTURING SAME

[76] Inventor: Peter Hagen, 290 Cetas Rd., Harbor Springs, Mich. 49740

[21] Appl. No.: 09/108,633

[22] Filed: Jul. 1, 1998

Related U.S. Application Data

[60] Provisional application No. 60/051,619, Jul. 1, 1997.

[51] Int. Cl.⁷ ..................................... D06N 7/04
[52] U.S. Cl. .......................... 428/145; 428/141; 428/147; 428/149
[58] Field of Search ..................................... 428/141, 145, 428/147, 149

[56] References Cited

U.S. PATENT DOCUMENTS

| | | | |
|---|---|---|---|
| 4,714,739 | 12/1987 | Arkles | 525/105 |
| 5,318,815 | 6/1994 | Newing et al. | 525/105 |
| 5,849,832 | 12/1998 | Virnelson et al. | 525/105 |

*Primary Examiner*—Melvyn I. Marquis
*Attorney, Agent, or Firm*—Dinnin & Dunn, P.C.

[57] ABSTRACT

A silicone compound having a textured surface when cured, said compound resulting from the combination of an elastomeric base comprising, a hydrolyzable silicone composition and a hydrolyzable silicone crosslinker and a rubber solution comprising a rubber and a solvent absorbable into said elastomeric base.

28 Claims, 1 Drawing Sheet

ELASTOMERIC COMPOUND WITH TEXTURED FINISH AND METHOD FOR MANUFACTURING SAME

Continuation of Provisional Application Ser. No. 60/051,619 Filed Jul. 1, 1997

FIELD OF THE INVENTION

This invention relates generally to the manufacture of elastomeric articles. More specifically, the invention relates to the fabrication of elastomeric compounds having a textured surface finish. Most specifically, the invention relates to the fabrication of a silicone rubber extrusion having a textured finish.

BACKGROUND OF THE INVENTION

Elastomeric materials have long been used as gaskets, seals, sealing compounds and other like components of architectural structures, vehicles, appliances and other such articles of manufacture. For example, in the field of architecture, elastomeric architectural strips are used to cover joints between building sections, at rooflines and around windows, both in new construction and as a repair item for preexisting buildings. Silicone polymers are particularly important in the fabrication of architectural pre-cured seals. These polymers are extremely flexible and strong, and their inertness makes them resistant to oxidation and photodegradation. Silicone rubbers may be fabricated in a variety of colors by the inclusion of pigments therein, so as to match a variety of substrates.

A wide variety of elastomeric articles, such as architectural pre-cured seals, gaskets and the like are frequently prepared from silicones or other polymeric compositions by a process in which a polymer composition is extruded to provide a shaped body which is subsequently cured to produce the finished item. In the context of the present disclosure, an extrusion process is defined to include any forming process wherein a precursor of the elastomer is forced under pressure into or through a shaping member such as a die or a mold to produce the shaped body. A number of shaping processes are known in the prior art. For example, U.S. Pat. No. 4,783,289 discloses a continuous extrusion process for the preparation of elongated silicone rubber members. According to the process, a silicone composition is extruded from a die into a body of water to produce an elongated member, which passes through the body of water and cures while it is doing so Elastomeric articles produced through extrusion processes of the prior art tend to cure with very smooth surface. In many instances, this smooth surface is not desirable in the article. For example, in architectural applications, it is generally desirable that joints and seals blend in with the appearance of the building, and the glossy surface of the elastomer contrasts strongly with the texture of stone, wood, concrete, stucco, metal and other such building materials. For reasons such as these, the prior art has made various efforts toward providing a matte and/or textured finish on extruded elastomeric items. For example, a textured finish can be provided to an item by curing the elastomer within a mold having a textured surface. This approach is impractical when very large, or long, items such as architectural pre-cured seals are being fabricated, or when the residence time of the article in the mold is a factor in the logistics or economics of the molding process. Other approaches include providing a textured surface by using a roller which forms the surface of the yet uncured compound, or by brushing, sanding or otherwise abrading the surface. These approaches require an additional processing step and is not always practical, particularly when the items being manufactured having large or complex, surfaces. In yet another approach, the finished articles are provided with a textured surface by overcoating them with another compatible material. Again, this requires a complicated post-processing step, and the technique often is not applicable when the item includes surface characteristics, which would be masked by the topcoat. This process is labor intensive and requires the precisely controlled extra process.

Other known attempts to create a texture within the silicone compound are less satisfactory than the present invention. In particular, attempts have been made to add sand to the silicone compound to add texture to the otherwise smooth surface. However, the sand adversely affects the silicone matrixes and results in a harder, less flexible material with reduced elastomeric properties crucial for construction use. Further, the range of textures is limited and less aesthetically pleasing. Another method for creating a surfaced texture to some degree (matte finish) is shown in U.S. Pat. No. 5,595,695. This process, of exposing the surface of the elastomer to humid atmosphere requires special equipment to cure the profile.

Thus, it will be appreciated that there is the need for a process by which elastomeric compounds, particularly silicone rubber elastomeric articles, having a textured finish may be fabricated. The process should not require any post-cure processing steps nor should it require any long residence time of the article in a shaping die or mold during the curing process. It is further desirable that any such technique be compatible with continuous fabrication processes such as those used for the extrusion of silicone rubber seals. It is also desirable that any such technique not requires extensive modification of presently employed processing equipment. Further, the process should be adaptable to rapid changes in the texture to be produced or the color of the material produced.

The use of silicone based sealant, is similarly well known in the construction industry. These types of products are commercially available from Dow Corning Corp., Midland, Mich.: DC732 Multi Purpose Sealant, DC790 Building Sealant, DC795 Building Sealant and from General Electric Comp., Waterford, N.Y.: GE1200, GE SilProof. These products are used to fill in or seal or conceal joints in construction, such as expansion joints in structural wall or floor members. These sealant or caulks are liquid or paste like (uncured) in storage but as they are hydrolyzable, will rapidly begin to cure when exposed to atmospheric humidity. These sealant are typically stored in tubes and are dispensed through a nozzle at one end of the tube by forcing the enclosing wall at the opposite end of the tube toward the nozzle. This form of application is well known in the industry, and utilizes an applicator commonly referred to as a caulk gun. When the sealant flows from the nozzle of the storage tube it typically forms a bead of a diameter dependent upon the diameter and cross section of the nozzle and upon the rate of application. This bead may then be manually formed to create a more aesthetically appealing appearance, as with a putty knife or finger. The bead, whether formed or not, will cure with a relatively smooth appearance, creating the same contrast with textured surfaces as discussed above. Thus, it is preferable to have a sealant, which will cure with a textured surface to blend in with the surrounding surface.

The present invention is directed to elastomeric compounds having a textured finish. The compound is particularly suited for the fabrication of silicone rubber articles and may be implemented in a continuous fabrication process, such as that used for the manufacture of elongated architectural pre-cured seals. The present invention also has significant artistic applications. The method for manufacturing the compound of the present invention is simple to implement and control, and yields high quality, textured finished, cured elastomeric articles.

The present invention allows a profile to be extruded with a texture without additional processing. The texture can be varied by varying the contents of the silicone substance extruded. The present invention also allows a sealant or filler to be produced that can be stored in liquid form or paste like form, applicable through ordinary caulk gun type applicators or other known application methods, and will cure with a textured surface.

These and other advantages of the present invention will be readily apparent from the drawings, discussions and description, which follow.

BRIEF DESCRIPTION OF THE INVENTION

The present invention is a composition comprising a combination of a siloxane compound base (containing 50% by weight hydroxyl terminated polyorganosiloxane (Silicone-polymer), 40% by weight inactive fillers (such as calcium carbonate) and 10% by weight of an active filler (such as finely dispersed silica), and a solution of a rubber compound dissolved in a solvent (such as mineral spirits). The silicone base will absorb the solvent and precipitate the rubber compound, yielding a textured finish. Alternatively, the composition may be packed in its pre-cured state for use as a sealant or filler, such as caulk, which will cure with a textured finish.

DETAILED DESCRIPTION OF THE INVENTION

Figure 1:
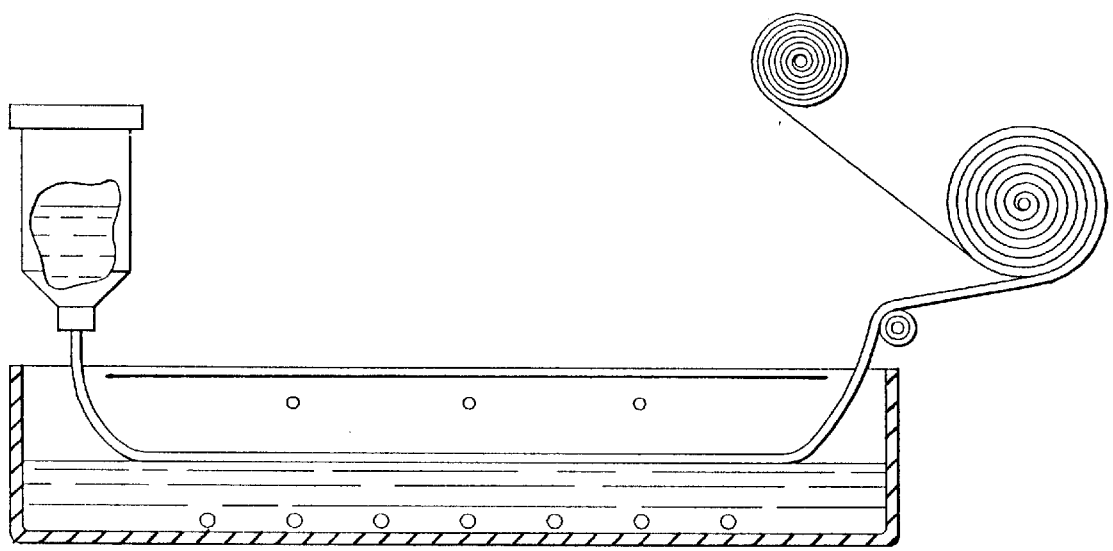
FIG. 1 is a schematic, longitudinal, cross sectional view of one apparatus for carrying out the method of the present invention.

The composition of the present invention consists of the combination of a rubber in solution with an elastomeric base, which will absorb the solvent and precipitate the rubber to form a textured surface to the resulting elastomeric composition. Hydrolyzable siloxane formulations are the preferred elastomeric base due to their wide acceptance in the construction industry for the strength and flexibility of the resulting compound. Further, the silicone compound readily absorbs the solvent of the rubber solution, precipitating the rubber. Any soluble rubber may be used, in solution with an appropriate solvent, which will be absorbed into the elastomeric base. A solution of one part Kraton® (Shell: Kraton® G-1657) to three parts mineral spirits is preferred due to the solubility of Kraton® in solvent and the resulting strength and flexibility of the resulting elastomer.

The compound may also include various components known in the art, such as crosslinker, a catalyst and pigments. Although the invention is not restricted to a particular formula, a formula which has yielded a superior extruded profile is:

93% by weight Silicone base (50% by weight silicone polymer, 40% by weight CaCO3, 10% by weight silica)

2% by weight Kraton® solution (25% by weight Kraton® in mineral spirits)

1% by weight Catalyst

4% by weight Crosslinker—Slurry

The components are mixed together by standard means that provide a homogeneous mixture. The preferred mixing apparatus is an in-line dynamic mixer wherein the components are fed at a constant rate in a non-pulsating manner into one end of the mixer and the mixture is extruded at a constant rate through a shaping die located at the opposite end of the mixer. For extruding, the composition is maintained at a temperature greater than 5° C., preferably in a range of about 10° C. to 25° C. For the sealant, the composition may be extruded directly into the product container, such as the familiar caulk containers.

The amount or degree of texturing can be controlled by the nature of the mixing of the Kraton® solution into the silicone base. If the mixture is highly mixed, comparable to whipping in culinary recipes, the resulting composition will have a relatively smooth surface, similar to the surface of a fine yet abrasive substance such as sandpaper. If the mixture is lightly mixed, comparable to folding in culinary recipes, the resulting composition will be highly textured, similar to a rough stucco surface.

Other variables in the curing process such as temperature and humidity will also effect the degree of texturing produced in the composition.

The mixed composition can be extruded through a shaping die, which is held by a die holder attached to the outlet of the container, which holds the mixed composition. Preferably the composition is extruded through a shaping die held by a die holder attached to the mixing apparatus. The shaping die is a simple plate die of metal or plastic. A complicated or rugged die is not required because the composition is of a liquid or paste viscosity so the pressures necessary for extrusion are relatively low, obviating the need for high strength constructions. The pressures typically employed are in the range of about 100–500 psi.

The compound may alternatively be forced into individual containers, for example commonly used cartridges, similar to the extrusion process above. The hydrolyzable elastomeric compound can thus be shipped in its uncured liquid state and will cure when applied. The surface when cured will retain the texture resulting from the precipitation of the Kraton®.

As noted above, typical compositions for the preparation of an extruded body of silicone rubber or a silicone sealant are:

1. a hydrolyzable siloxane composition of the type comprising a polydiorganosiloxane having at least two silicone-bonded hydrolyzable groups per molecule;
2. a hydrolyzable silicone crosslinker;
3. a filler; and
4. an optional curing catalyst Polydiorganosiloxanes useful in such compounds are commercially available.

The crosslinker has at least three silicone-bonded groups per molecule preferably four. The silicone crosslinker may be a polyalkoxy-silane. Hydrolyzable silicone crosslinkers useful in such compounds are commercially available.

The filler can be a reinforcing or an extending filler or a combination of both. The filler can be treated or untreated. Examples for reinforcing fillers include fumed or precipitated silica. A preferred silica-treating agent is hexamethylendisilazane. Examples of extending fillers include, Calcium-Carbonate, titanium dioxide, diatomaceous earth, metal oxides, quartz, carbon black, graphite, glass fibers, microspheres, microballoons, carbon fibers, silicon carbide, and the like.

A preferred treating agent for calcium carbonate is stearic acid. Fillers and treating agents useful in such compounds are commercially available.

The hydrolyzable siloxane composition optionally comprises a curing catalyst to accelerate the condensation-type crosslinking reaction. Examples of curing catalysts include tin catalysts, e.g. dibutyltindiacetate, dibutyltindilaurate, stannous octoate and other similar compounds. Examples of the curing catalyst also include other metal salts of carboxylic acid, e.g. metal carboxylates in which the metal atoms may include iron, cobalt, manganese, and zinc; organo titanate and chelated titanates, e.g. tetrabutyl titanate and the like. Curing catalysts useful in such compounds are commercially available. The preferred hydrolyzable siloxane compositions are preferably in a multicomponent package delivery form wherein one package may comprise the polydiorganosiloxane and fillers; a second package comprises the polyalkoxy silane cross-linker and a third package the catalyst. Multicomponent delivery helps to prevent premature curing of the composition.

Other additives commonly used in silicone sealant can be used in the hydrolyzable siloxane compositions of the present process, such as color pigments or dyes; fungicides; solvents; adhesion promoters; cure regulators; plasticizers such as silicone fluids, e.g. trimethyl end blocked dimethylpolysiloxane having a viscosity in the range of about 0.05 to 100 Pa.s at 25° C. Such additives are commercially available.

There is no specific restriction on the ratios of the components of the hydrolyzable siloxane composition. However, the ratio of components should be selected so that the hydrolyzable groups of the polydiorganosiloxane, and incidental moisture which may be present, such as moisture on the filler and the hydrolyzable groups of the crosslinker are present in ratios that promote cure after the composition is:

1. Extruded into the aqueous curing bath and during the retention time in the aqueous curing bath; or
2. Deposited in liquid form at the desired location.

In the preferred composition, base, crosslinker and catalyst are present in a balanced amount to promote the cure outside of the mixer-extruder-equipment. The type and amount of catalyst should be selected to effect cure within the retention time in the production line.

Referring to FIG. 1 there is shown stylized depiction of an apparatus typical for the manufacture of an extruded article according to the present invention. The apparatus includes a tank having a volume of liquid, which is typically water, contained therein. The apparatus further includes a cover, which is supported by the sidewalls of the tank in a spaced apart relationship with the top surface of the liquid so as to define a headspace disposed between the liquid and the cover.

The apparatus may further include a number of heaters submerged in the liquid and a series of nozzles supported by the sidewall of the tank in the headspace.

The apparatus further includes an extruder in communication with a supply of material, which is curable to form the elastomer. The extruder includes a mixer portion for mixing and supplying a stream of the uncured elastomer composition under pressure, and further includes a forming member, which in this case comprises an extrusion die. An extrusion apparatus of this type is well known in the art.

In operation, the extruder operates to provide a shaped body of the uncured elastomer composition and to extrude this body onto the surface of the liquid in the tank. The body of material begins to cure as it is extruded. Curing takes place, as will be explained in greater detail herein below, as a result of a chemical reaction involving hydrolysis of various siloxane compounds and can be enhanced by the addition of curing agents, catalysts and the like and can be further enhanced by the application of heat. The composition is supported by the liquid so that the lower surface thereof is in contact with the liquid and the upper surface referred to herein as the free surface, is exposed to the atmosphere in the head space. In general, the density of the liquid and the extruded polymer will be selected such that the polymer will readily rest atop the liquid surface. Toward that end, the liquid should have a density comparable to the polymer; however, in the instance where the extruded material is a highly hydrophobic material such as a silicone, and the liquid is water, surface tension will serve to support the body atop the liquid even though the density of the body is greater than that of the liquid. If necessary, the density of the liquid may be adjusted by the addition of salts or the like. The extruded body travels along the length of the tank and this travel may be facilitated by establishing a flow of the liquid along the length of the tank as for example by inclusion of a pump (not shown). The length of the tank, the temperature of the liquid, and the speed of the extrusion are selected so that the extruded body is cured to a sufficient degree to be self supporting by the time it reaches the end of the tank. After leaving the tank, the at least partially cured, self-supporting body is directed by a first turning roller onto a take up roller. As known in the art, a layer of interleaf material, dispensed from a interleaf roll, may be interwound with the elastomer onto the take up roller so as to prevent sticking. The interleaf is optional and facilitates rolling and unrolling the cured elastomer. As is known in the art, the take up roll may be driven by a motor, (not shown). In some instances, tension provided by the take up roller may be employed to advance the extruded body through the tank.

The foregoing represent one preferable group of compositions and extrusion method which may be utilized in the practice of the present invention. The use of the liquid bath shown in FIG. 1 will create a glossy but textured finish on the surfaces of the extrusion. Materials prepared in accord with this process comprise high quality, high strength silicone rubber extrusions having a gloss finish on the surface, which was in contact with the liquid, and a textured finish on all surfaces.

Although the foregoing description primarily concerned low viscosity silicone extrusions based on condensation cure chemistry, the present invention may be carried out in connection with other materials such as products based on addition cure chemistry (Pt-cure) and peroxide cure chemistry and other curing apparatus.

It is also to be understood that while the invention has been described in general with reference to curing elongated bodies in a continuous process, the invention may be also adapted to processes for curing discreet items in either a batch or continuous process. While the invention has primarily been described with reference to silicone compositions, other moisture responsive compositions including urethanes and the like may be provided with textured finishes in accordance with the present invention.

In view of the foregoing, it is to be understood that the drawings, discussion and description herein are merely meant to represent particular embodiment of the invention and are not meant to be a limitation upon the practice thereof. It is the following claims, including all equivalents, which define the scope of the invention.

What is claimed is:

1. A composition having a textured surface when cured, said composition resulting from the combination of:

an elastomeric base comprising, a hydrolyzable silicone composition and a hydrolyzable silicone crosslinker; and a rubber solution comprising a soluble rubber and a solvent absorbable into said elastomeric base.

2. The composition of claim 1 further comprising a filler; and a silicone curing catalyst.

3. The silicone compound of claim 1 wherein said hydrolyzable siloxane composition includes a polydiorganosiloxane having at least two silicone-bonded hydrolyzable groups per molecule.

4. The composition of claim 1 wherein said composition comprises about 60 to 98 percent by weight elastomeric base.

5. The composition of claim 1 wherein said composition comprises about 90 to 98 percent by weight elastomeric base.

6. The composition of claim 1 wherein said rubber solution comprises greater than 5% by weight soluble rubber.

7. The composition of claim 1 wherein said rubber solution comprises greater than 20% by weight soluble rubber.

8. The composition of claim 1 wherein said composition comprises 1 to 40 percent by weight rubber solution.

9. The composition of claim 1 wherein said composition comprises 1 to 5 percent by weight rubber solution.

10. The composition of claim 2 wherein said composition comprises:

60–98% by weight elastomeric base

1–40% by weight rubber solution 0.1–3% by weight silicone curing catalyst

1–10% by weight crosslinker.

11. The composition of claim 2 wherein said composition comprised:

90–98% by weight elastomeric base

1–5% by weight rubber solution 0.1–3% by weight silicone curing catalyst

1–8% by weight crosslinker.

12. An elongated elastomeric strip having a textured surface, comprising a combination of an elastomeric base comprising a hydrolyzable silicone composition including a polydiorganosiloxane having at least two silicone-bonded hydrolyzable groups per molecule and a hydrolyzable silicone crosslinker; a rubber solution comprising a soluble rubber and a solvent absorbent into said elastomeric base; and a silicone curing catalyst.

13. The composition of claim 12 wherein said composition comprises:

60–98% by weight elastomeric base

1–40% by weight rubber solution 0.1–3% by weight silicone curing catalyst

1–10% by weight crosslinker.

14. The composition of claim 12 wherein said composition comprises:

90–98% by weight elastomeric base

1–50% by weight rubber solution 0.1–3% by weight silicone curing catalyst

1–10% by weight crosslinker.

15. A silicone-based sealant having a textured finish when extruded, said sealant comprising:

an elastomeric base comprising a hydrolyzable silicone composition and a hydrolyzable silicone crosslinker;

and a rubber solution comprising a soluble rubber and a solvent absorbent into said elastomeric base, and a silicone curing catalyst.

16. The silicone-based sealant of claim 15 wherein said compound comprises:

60–98% by weight elastomeric base

1–40% by weight rubber solution 0.1–3% by weight silicone curing catalyst

1–10% by weight crosslinker.

17. The silicone-based sealant of claim 15 wherein said compound comprises:

90–98% by weight elastomeric base

1–5% by weight rubber solution 0.1–3% by weight silicone curing catalyst

1–8% by weight crosslinker.

18. A process for manufacturing an elastomeric silicone compound having a textured finish when extruded and/or cured, said process including the steps of combining an elastomeric base comprising a hydrolyzable silicone composition including a polydiorganosiloxane having at least two silicone-bonded hydrolyzable groups per molecule and a hydrolyzable silicone crosslinker; with a soluble rubber solution comprising a rubber and a solvent absorbent into said elastomeric base; filler and a silicone curing catalyst; agitating the combination; and forcing the combination in a flowable state through an orifice.

19. The process of claim 18 further comprising the step of varying the degree of agitation to control the degree of texturing of said compound.

20. The process of claim 18 further comprising of steps of:

placing a container for packaging said compound downstream of said orifice;

collecting said compound in said container; and sealing said container to the atmosphere to inhibit curing.

21. The process of claim 18 wherein said orifice comprises an extrusion die and said process further comprises conveying the product in a continuous strip from the extrusion die.

22. The process of claim 21 further comprising the step of contacting a surface of the continuous strip with an aqueous solution to produce a glossy finish on said orifice.

23. The produce produced by the process of claim 21 wherein said continuous strip has a continuous cross section determined by the shape of said orifice.

24. The produce produced by the process of claim 20,wherein said compound will cure when said container is unsealed and said compound is exposed to the atmosphere.

25. The composition of claim 1 further consisting essentially of a filler; and a silicone curing catalyst selected from the group comprising: a tin curing catalyst, a metal carboxylate curing catalyst, an organo titanate curing catalyst, and a chelated titanate curing catalyst.

26. The elongated strip of claim 12 wherein said silicone curing catalyst is selected from the group consisting essentially of: a tin curing catalyst, a metal carboxylate curing catalyst, an organo titanate curing catalyst, and a chelated titanate curing catalyst.

27. The silicone-based sealant of claim 15 wherein said silicone curing catalyst is selected from the group consisting essentially of: a tin curing catalyst, a metal carboxylate curing catalyst, an organo titanate curing catalyst, and a chelated titanate curing catalyst.

28. The process for manufacture of claim 18 wherein said silicone curing catalyst is selected from the group consisting essentially of: a tin curing catalyst, a metal carboxylate curing catalyst, an organo titanate curing catalyst, and a chelated titanate curing catalyst.

\* \* \* \* \*

UNITED STATES PATENT AND TRADEMARK OFFICE
CERTIFICATE OF CORRECTION

PATENT NO. : 6,027,788
DATED : February 22, 2000
INVENTOR(S) : Hagen

It is certified that error appears in the above-identified patent and that said Letters Patent is hereby corrected as shown below:

Column 8, line 1, claim 23, delete "produce" and insert --product--.
Column 8, line 1, claim 24, delete "produce" and insert --product--.

Signed and Sealed this

Twentieth Day of February, 2001

Attest:

NICHOLAS P. GODICI

Attesting Officer    Acting Director of the United States Patent and Trademark Office